(12) United States Patent
Davins-Valldaura et al.

(10) Patent No.: US 12,351,189 B2
(45) Date of Patent: Jul. 8, 2025

(54) METHOD FOR ESTIMATING AND ADJUSTING THE SPEED AND ACCELERATION OF A VEHICLE

(71) Applicants: RENAULT s.a.s., Boulogne-Billancourt (FR); NISSAN MOTOR CO., LTD., Yokohama (JP)

(72) Inventors: Joan Davins-Valldaura, Le Chesnay (FR); Paul Lemiere, Gace (FR); Guillermo Pita-Gil, Versailles (FR); Denis Mallol, Provins (FR); Renaud Deborne, Le Chesnay (FR)

(73) Assignees: AMPERE S.A.S., Boulogne-Billancourt (FR); NISSAN MOTOR CO., LTD., Yokohama (JP)

(*) Notice: Subject to any disclaimer, the term of this patent is extended or adjusted under 35 U.S.C. 154(b) by 0 days.

(21) Appl. No.: 18/629,501

(22) Filed: Apr. 8, 2024

(65) Prior Publication Data
US 2024/0359695 A1    Oct. 31, 2024

Related U.S. Application Data

(63) Continuation of application No. 17/605,448, filed as application No. PCT/EP2019/060287 on Apr. 23, 2019, now abandoned.

(51) Int. Cl.
*B60W 40/105* (2012.01)
*B60W 50/00* (2006.01)
*B60T 8/172* (2006.01)

(52) U.S. Cl.
CPC .......... *B60W 40/105* (2013.01); *B60W 50/00* (2013.01); *B60W 2050/0054* (2013.01);
(Continued)

(58) Field of Classification Search
CPC .............. B60W 40/105; B60W 50/00; B60W 2050/0054; B60W 2420/503;
(Continued)

(56) References Cited

U.S. PATENT DOCUMENTS

2004/0199300 A1* 10/2004 Gustafsson ........... B60T 8/1755
701/1
2016/0046186 A1* 2/2016 Gao ....................... B60K 28/16
701/90
(Continued)

FOREIGN PATENT DOCUMENTS

CN    104601072 A    5/2015
FR    2 935 807 A1   3/2010

OTHER PUBLICATIONS

ISSN 1424-8220, Sensors 2006; title "Improving the response of a wheel speed sensor by using a RLS lattice algorithm" by ("Wilmer") (Year: 2006).*
(Continued)

*Primary Examiner* — Sohana Tanju Khayer
(74) *Attorney, Agent, or Firm* — Oblon, McClelland, Maier & Neustadt, L.L.P.

(57) ABSTRACT

A method for estimating the speed of a motor vehicle includes defining a first speed threshold that corresponds to a minimum speed value supplied by a vehicle wheel angular speed sensor, defining a second speed threshold that is greater than the first, estimating low speed values when the vehicle is running below the first speed threshold by using an estimation method of adaptive filtered type, measuring high speed values when the vehicle is running above the second speed threshold by using vehicle speed values supplied by the wheel angular speed sensor, and in the intermediate zone between the first and second speed thresholds, mixing high speed with low speed.

7 Claims, 2 Drawing Sheets

(52) U.S. Cl.
CPC ............... *B60W 2420/503* (2013.01); *B60W 2520/105* (2013.01); *B60W 2520/28* (2013.01)

(58) Field of Classification Search
CPC ......... B60W 2520/105; B60W 2520/28; B60T 2250/04; B60T 8/172; G01P 3/489
See application file for complete search history.

(56) References Cited

U.S. PATENT DOCUMENTS

2017/0219381 A1\* 8/2017 Kreider ................. B64G 1/286
2022/0252399 A1\* 8/2022 Terao ..................... G01P 21/00

OTHER PUBLICATIONS

International Search Report issued Jan. 20, 2020 in PCT/EP2019/060287 (Submitting English translation only), 2 pages.
French Preliminary Search Report issued Feb. 1, 2019 in Patent Application No. FR 1853991 (with English translation of categories of cited documents), 36 pages.
Wilmar Hernandez, "Improving the Response of a Wheel Speed Sensor by Using a RLS Lattice Algorithm" Sensors, vol. 6, No. 2, Jan. 1, 2006, pp. 64-79.

\* cited by examiner

METHOD FOR ESTIMATING AND ADJUSTING THE SPEED AND ACCELERATION OF A VEHICLE

CROSS-REFERENCE TO RELATED APPLICATIONS

This application is a continuation of and claims benefit under 35 U.S.C. § 120 to U.S. application Ser. No. 17/605,448, filed Apr. 23, 2019, which is a U.S. National Stage application of PCT/EP2019/060287, filed on Apr. 23, 2019, respectively, the entire contents of each of which are incorporated herein by reference.

TECHNICAL FIELD

The invention relates to the field of motor vehicles. It relates more particularly to a strategy for estimating the speed and the associated acceleration, ranging from high speeds to very low speeds, dispensing with the current sensor limits.

STATE OF THE ART

In the context of the development of control laws, the knowledge of a precise speed and of an associated acceleration are very important. For example, the control laws used on the ADAS (Advanced Driver Assistance Systems) systems and the driverless vehicle still need to have speed and acceleration information.

On the current vehicles, the speed and the acceleration are already calculated accurately above a certain threshold. If the real speed is below this threshold, the information on the speed and the acceleration is not available. This range of speeds is commonly referred to as "low speed".

The main problem is that, due to the limitations of the sensors used, the speed cannot be well estimated below said speed threshold.

Consequently, the control laws used cannot robustly control the different low speed systems; such as, for example:
The parking systems (known by the acronym HFPB, for Hands Free Parking Brake, and also known as autopark)
The ACC (distance regulator) systems for "Stop&Start" situations
The driverless car or TJP (Traffic Jam Pilot) system in traffic jam situations.

A second problem is the use of the acceleration value from the accelerometer. This value is not very accurate (it is subject to offsets) because of:
The position of the accelerometer after factory installation
Some external quantities such as the slope and the camber of the road.
The roll and the pitch of the body.

FIG. 1 represents a graph illustrating the problem encountered. The currently estimated speed of the vehicle is represented by the curve 1, the accelerometer value is represented by the curve 2, the curve 3 represents the "peaks" of the coder wheels (that is to say the peaks of signals that they send on the passage of a tooth, such a wheel also being called "toothed wheel") and, between the lines A and B, the low speed zone where the vehicle is running below a threshold of 1 km/h. The peaks indicate whether or not the wheels have turned and give an image of the speed by their amplitude.

In the zone between the lines A and B, the speed is unknown. For example, in the right hand part of the low speed zone, it can be seen that the wheels are turning (presence of peaks from the coder wheels) but no speed is detected below the threshold of 1 km/h.

Finally, the plot from the accelerometer (curve 2) shows an offset in the low speed zone (zone without the presence of peaks and an accelerometer constant at non-zero value).

Thus, it becomes necessary to develop a strategy for estimating the speed and the acceleration in the low speed zone (between A and B), complementing the speed value already present on the car.

One example of such a strategy is known from the document "Improving the Response of a Wheel Speed Sensor by Using a RLS Lattice Algorithm" by W. Hernandez, published in Sensors in June 2006, pages 64-79. This document more particularly discloses the use of adaptive filters to resolve the problem of inaccuracy at low speed and notably of the Kalman filters.

The main advantage of this type of software solution based on adaptive filtering lies in its low cost.

However, a greater problem remains beyond the estimation of the speed, that is the discontinuity of the speed and acceleration values estimated upon a transition from the high speed range, situated above the threshold, to the low speed range situated below the threshold.

The aim of the present invention is notably to resolve this technical problem by proposing a method that makes it possible to estimate the speed and/or the acceleration of a vehicle at low speed while being suited to the accurate measurement of speed of the vehicle at medium and high speeds, without presenting any discontinuity of these values.

DESCRIPTION OF THE INVENTION

To this end, the subject of the invention is a method for estimating the speed of a motor vehicle wherein:
A first speed threshold SV1 is defined that corresponds to a minimum speed value supplied by a vehicle wheel angular speed sensor;
A second speed threshold SV2 is defined that is greater than SV1; Low speed values when the vehicle is running below SV1 are estimated by using an estimation method of adaptive filter type;
High speed values when the vehicle is running above SV2 are measured by using vehicle speed values supplied by the wheel angular speed sensors;
In the intermediate zone between SV1 and SV2, there is a mixing of high speed with low speed.

According to the invention, three speed ranges are used: low speed, high speed and an intermediate mixing zone. The use of a mixing range makes it possible to avoid discontinuity on both speed and the acceleration (essential for guaranteeing the stability of the control laws).

Advantageously, the adaptive filter is a Kalman filter.

Advantageously, in the intermediate zone between SV1 and SV2, the mixing is done periodically at successive instants by using a linear mixing method according to the formula:

$$\text{Speed} = \text{Speed}_{kalman}^{low} \times \frac{SV2 - \text{Speed}_{t-1}}{SV2 - SV1} + \text{Speed}_{vehicule}^{high} \times \frac{\text{Speed}_{t-1} - SV1}{SV2 - SV1}$$

This linear mixing makes it possible to calculate the mixed speed (speed) by using the speed values from the Kalman method ($\text{Speed}_{kalman}^{Low}$) and the vehicle speed ($\text{Speed}_{vehicle}^{high}$)

The vehicle speed (Speed$_{vehicle}^{high}$) is the speed measured using the angular speed of the wheels.

The speed is the mixed speed at the current instant t, speed$_{t-1}$ is the mixed speed at the preceding mixing instant t−1, (Speed$_{kalman}^{Low}$) is the speed value calculated by the Kalman method at the current instant t and (Speed$_{vehicle}^{high}$) is the speed value measured by the angular sensor at the current instant t.

According to a feature of the invention, the first threshold SV1 can be 1 km/h.

According to another feature of the invention, the second speed threshold SV2 can be 1.5 km/h.

Advantageously, in the step C), the value of the acceleration is also estimated using the Kalman filter and, in the step E), there is also a mixing of the acceleration values between SV1 and SV2.

One advantage of the invention is that the speed is estimated without discontinuity and that the associated acceleration value can also be taken into account.

BRIEF DESCRIPTION OF THE FIGURES

The invention will be better understood on reading the following description of an exemplary embodiment given as an illustrative example, the description referring to the attached drawings in which.

DETAILED DESCRIPTION

Figure 1:
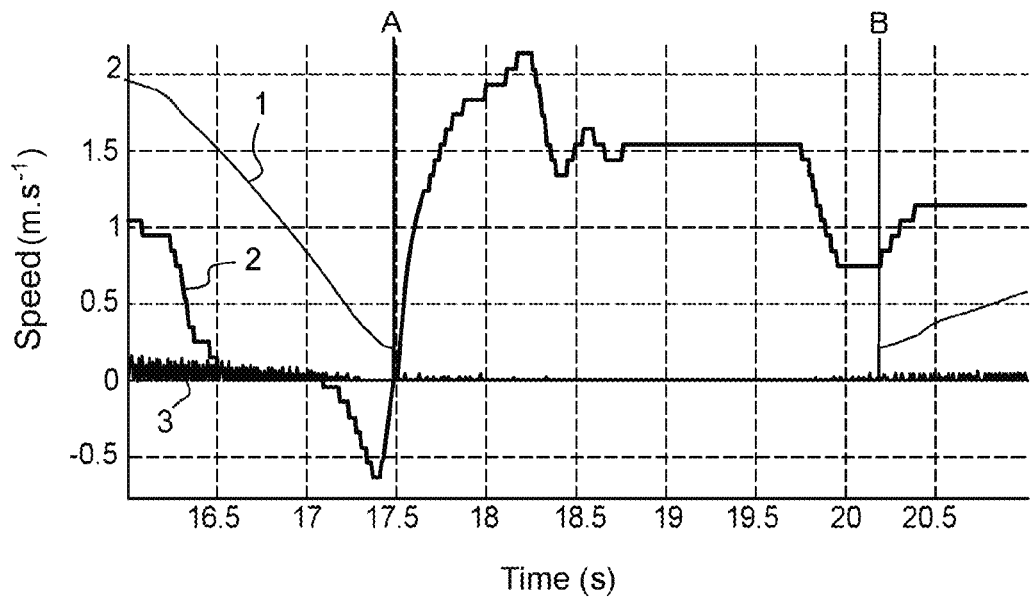
FIG. 1 represents a graph illustrating the problems encountered at low speeds.
Figure 2:
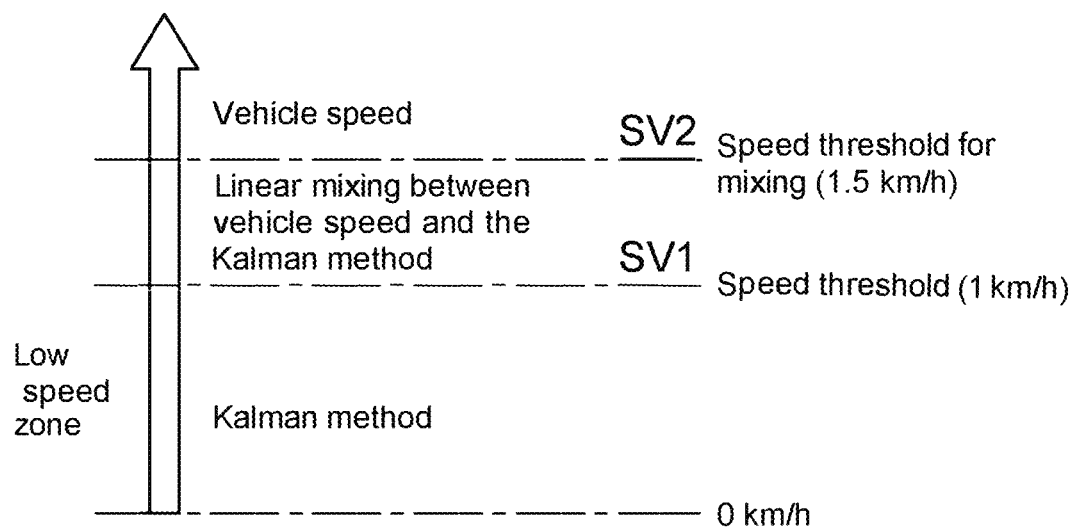
FIG. 2 schematically illustrates the principle of the invention.

FIG. 2 schematically represents the general principle of the invention in which 3 speed zones are defined:
- a low speed zone, below a first threshold SV1 below which the values of the speed and of the acceleration are not available.
  Typically 1 km/h.
  In this zone, the speed is measured according to the Kalman method. This method is known per se to the person skilled in the art, but it is recalled below for greater clarity of the explanation of the invention.
- A high speed zone above a second threshold SV2 greater than the first threshold SV1, for example 1.5 km/h. In this zone, the values of the speed and of the acceleration are supplied by the vehicle sensors; and
- A mixing zone situated between the two thresholds SV1 and SV2.

I. Estimation of the Speed with the Kalman Method

I.1 Conventional Kalman Filter

A Kalman filter takes into account three state variables [x]:
- x(1) distance travelled from the first instant t;
- x(2) speed information;
- x(3) last acceleration.

The two sensor measurements [z] used for the estimation of the state variable are:
z(1) the average of the peaks of the coder wheels (WT). The signals of the peaks of the 4 wheels are already present in the vehicle messaging system (CAN). This information makes it possible to have an idea of the displacement of each wheel by counting, at each sampling interval, how many teeth of the coder have passed (typically 48 teeth).
z(2) the angular speeds of the wheels (WS). The signals of the angular speeds of the four wheels are already present in the vehicle messaging system (CAN). The average of the rear wheels will be used in the Kalman (axis of non-drive wheels, that is to say, less slip in the start-up phases).

The Kalman filter equation system is:
1) Prediction $$\hat{x}_{k|k-1} = F_k \hat{x}_{k-1|k-1} + B_k u_{k-1}$$

$$P_{k|k-1} = F_k P_{k-1|k-1} F_k^T + Q_k$$

2) Correction $$\tilde{y}_k = z_k - H_k \hat{x}_{k|k-1}$$

$$S_k = H_k P_{k|k-1} H_k^T + R_k$$

$$K_k = P_{k|k-1} H_k^T S_k^{-1}$$

$$\hat{x}_{k|k} = \hat{x}_{k|k-1} + K_k \tilde{y}_k$$

$$P_{k|k} = (I - K_k H_k) P_{k|k-1}$$

The notation used is as follows:
x: state of the system (vector)
z: sensor measurements (vector).
P: estimated covariance matrix.
$F_k$: state transition matrix
$U_k$: command input
$B_k$: command transition matrix.
H: measurement transition matrix
Q: model noise covariance matrix (accuracy)
R: measurement noise covariance matrix (accuracy)
I: identity matrix
$\hat{x}$: estimated value of the variable x
$\tilde{x}$: measured value of the variable x Note: In the Kalman filter fitted, the vector u is zero, which simplifies the first equation.

I.2 Estimation of the Speed

At the input of the system, there are the two sensor data which correspond to the wheel speeds (WS) and the peaks of the coder wheels (WT). These data are processed (DP: "Data processing") then passed into the Kalman filter ("Estimation" block) from which emerge a speed and an acceleration.

First Step—"Data Processing"

Wheel pulse: the coder sends the position of the last tooth seen. We will use this increment in the number of teeth [WT] during a sampling interval of the system [Te] (interval necessarily at the same rate as the recording to the sensor). Then, the average value between the four wheels will be used as measurement of [WT]. The value equivalent to a linear speed and using the peaks of the wheels is $$\frac{2\pi R}{\text{nb\_pic}} * WT$$

with [R] the radius of the wheels assumed constant and known (setting parameter) and [nb_pic] the number of teeth of the coder.

WS: The average of the angular speeds of the rear wheels (axis of non-drive wheels, that is to say, less slip in the start-up phases) will be used in the Kalman filter. This angular speed [WS] will be converted into linear speed on the basis of:

$$\frac{2\pi R}{60} * WS$$

Second Step: "Estimation"

The Kalman model used is as follows:
State Equation:

$$x_k = \begin{pmatrix} d_k \\ v_k \\ a_k \end{pmatrix} = \begin{pmatrix} d_{k-1} + Te*v_{k-1} + \frac{Te^2}{2}*a_{k-1} \\ v_{k-1} + Te*a_{k-1} \\ a_{k-1} \end{pmatrix}$$

$d_k$, $v_k$ and $a_k$ are, respectively, the distance travelled, the speed and the acceleration on the iteration k of the filter.
Imput Data Vector $$z_k = \begin{pmatrix} \frac{2\pi R}{nb\_pic}*WT \\ \frac{2\pi R}{nb\_pic}*\text{Wheel\_Top} + \frac{2\pi R}{60}*WS \\ \frac{1}{Te}*\frac{2\pi R}{60}*WS \end{pmatrix}$$

nb_pic=96, the increment number of the coder.
Te=0.01 s, the sampling period.

The state equation represents the first line of the prediction step shown previously. The hypothesis made here is a constant changing of the acceleration.

The input vector (z) corresponds to the insertion of the sensor data into the Kalman filter. The datum [WT] corresponds to the sum of the peaks of the coder wheels divided by four (the number of wheels). The variable [WS] itself is equal to the sum of the speed of the rear wheels of the vehicle divided by 2.

Since this last datum is not always available (falls to 0 below SV1), an adaptation of the matrix H (see the Kalman equation system, correction phase) in the Kalman filter has been made.

II. Mixing of Speeds

In the zones of the speeds situated between the first threshold SV1 and the second threshold SV2, between 1 km/h and 1.5 km/h in the example represented in FIG. 2, there is a mixing of high speed with low speed.

More particularly, the mixing was done using a linear mixing method according to the formula:

$$\text{Speed} = \text{Speed}_{kalman}^{low} \times \frac{SV2 - \text{Speed}_{t-1}}{SV2 - SV1} + \text{Speed}_{vehicule}^{high} \times \frac{\text{Speed}_{t-1} - SV1}{SV2 - SV1}$$

This linear mixing makes it possible to calculate the value of the mixed speed (speed) by using the speed values of the Kalman method ($\text{Speed}_{kalman}^{Low}$) and the vehicle speed ($\text{Speed}_{vehicle}^{high}$)

The vehicle speed ($\text{Speed}_{vehicle}^{high}$) is the speed calculated by using the angular speed of the wheels. At low speed, the value of the high speed of the vehicle is not available.

In order to guarantee a correct mixing, the value of the reference speed used is the last speed value. This value is used to define the weight of each speed (weight defined between the relative distance in relation to the thresholds). For example, the weight of the speed of the Kalman method is defined as $$\left(\frac{SV2 - \text{Speed}_{t-1}}{SV2 - SV1}\right)$$

|  | t − 1 (last value) | t = 0 (current value) |
|---|---|---|
| Mixed speed | Speed$_{t-1}$ | Speed |
| Estimated speed (with the Kalman method) | Not used | Speed low Kalman |
| Vehicle speed (using the angular speeds) | Not used | Speed high Vehicle |

The choice of reference speed makes it possible to guarantee a continuity during the mixing.

The use of the speed estimated with the Kalman method is not possible because the initial value can be greater than SV2 (because of the delay of the filter). The use of the vehicle speed is also not possible because it shows a discontinuity at low speeds where the angular speed is no longer available.

III. Examples of Results Obtained

III.1—Start-Up Phase

Figure 3:
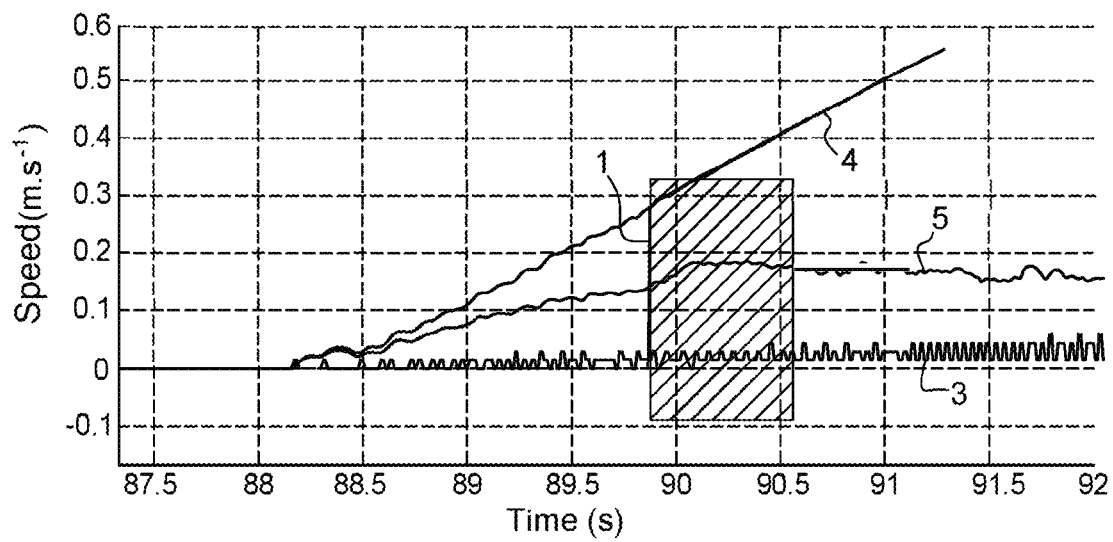
FIGS. 3 and 4 represent examples of results of the use of the method of the invention in vehicle starting and stopping phase.

FIG. 3 represents results obtained in the start-up phase of the vehicle. The green curve corresponds to the current system speed, the curve 3 shows WT, the curves 4 and 5 respectively show the speed and the acceleration calculated according to the method of the invention.

Regarding the speed, it can be seen that the Kalman filter proposes an increasing speed 4 which meets the vehicle speed 1 used currently. The speed 4 calculated by the method of the invention takes off at the first detected wheel peak, that is to say, first peak of the curve 3.

Concerning the acceleration 5, the same observation can be made. The new estimation starts at the first peak detected and converges fairly well towards a value which corresponds to that expected for the speed 4.

The grey region corresponds to the transition region between low and high speed. It can be seen that there is no discontinuity and that the estimated speed value shows a coherent transition relative to the real speed dynamics of the vehicle.

III.2 in Braking Phase to Stop

Figure 4:
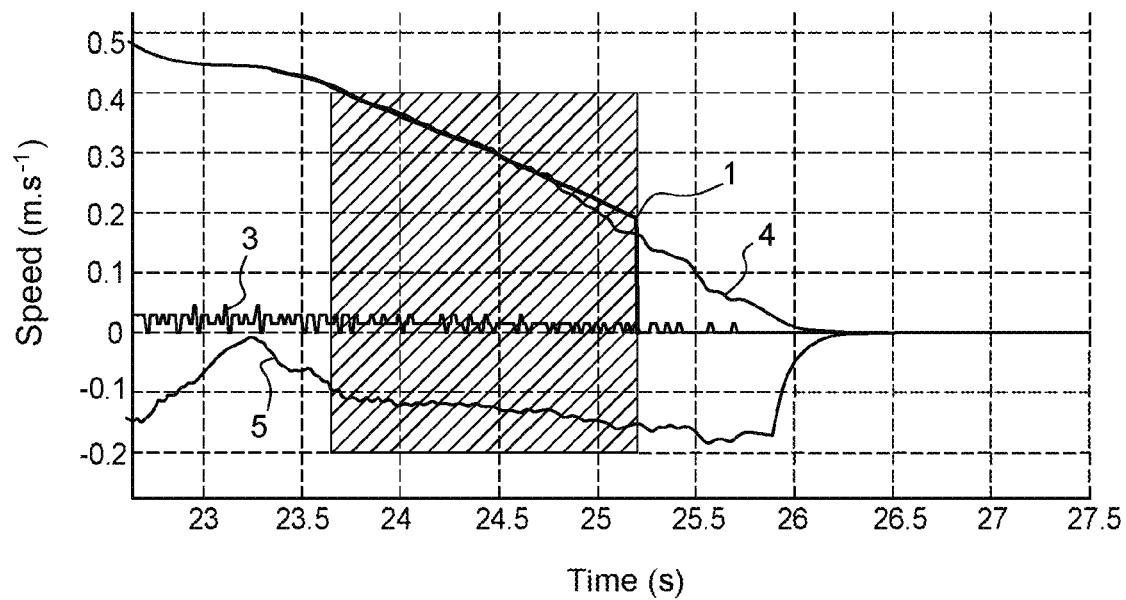

FIG. 4 represents results obtained in the stopping phase.

Looking at the speed, it can be seen that the curve 4 follows a speed profile that is more fairly in agreement with the coder wheel peaks than the curve 1. The stopping of the vehicle is also detected more cleanly with the method of the invention.

The acceleration 5 seems to correspond to the speed 4 proposed and stops at the same time as the speed 4.

The grey region corresponds to the transition region between high and low speed. It can be seen that there is no discontinuity and that the speed value 4 estimated by mixing shows a coherent transition relative to the Kalman speed dynamics.

The invention claimed is:

1. A method for estimating a speed of a motor vehicle comprising:
    defining a first speed threshold that corresponds to a minimum speed value supplied by a vehicle wheel angular speed sensor;
    defining a second speed threshold that is greater than the first speed threshold;
    estimating low speed values when the vehicle is running below the first speed threshold using a Kalman method with a Kalman filter, the estimating including using wheel pulses and an angular speed of wheels of the vehicle as inputs of the Kalman method;
    measuring high speed values when the vehicle is running above the second speed threshold by using vehicle speed values supplied by the wheel angular speed sensor; and
    mixing, in an intermediate zone between the first speed threshold and the second speed threshold, high speed with low speed,
    wherein, in the intermediate zone between the first speed threshold and the second speed threshold, the mixing is done periodically at successive instants by using a linear mixing method according to the formula:

$$\text{Speed} = \text{Speed}_{kalman}^{low} \times \frac{SV2 - \text{Speed}_{t-1}}{SV2 - SV1} + \text{Speed}_{vehicle}^{high} \times \frac{\text{Speed}_{t-1} - SV1}{SV2 - SV1}$$

in which speed is the mixed speed at the current instant t, $\text{speed}_{t-1}$ is the mixed speed at the instant t−1 at the preceding mixing instant t−1 ($\text{Speed}_{kalman}^{Low}$) is the speed value calculated by the Kalman method at the current instant t, ($\text{Speed}_{vehicle}^{high}$) is the speed value measured by the angular speed sensor at the current instant t, SV1 is first speed threshold, and SV2 is the second speed threshold, and
    wherein the vehicle is an automobile.

2. The method according to claim 1, wherein the first speed threshold is 1 km/h.

3. The method according to claim 1, wherein the second speed threshold is 1.5 km/h.

4. The method according to claim 1, wherein the estimating includes estimating a value of acceleration using the Kalman filter and the mixing includes a mixing of the acceleration values between the first speed threshold and the second speed threshold.

5. The method according to claim 1, wherein the estimating low speed values when the vehicle is running below the first speed threshold includes estimating an acceleration of the vehicle using the Kalman filter.

6. The method according to claim 1, further comprising:
    measuring an acceleration of the vehicle via an acceleration sensor when the vehicle is running above the second speed.

7. The method according to claim 6, wherein the estimating low speed values when the vehicle is running below the first speed threshold includes estimating the acceleration of the vehicle using the Kalman filter, and
    mixing, in the intermediate zone between the first speed threshold and the second speed threshold, the acceleration measured via the Kalman filter and the acceleration measured via the acceleration sensor.

* * * * *